United States Patent [19]

Lach et al.

[11] 4,374,435
[45] Feb. 15, 1983

[54] PASSENGER ENTERTAINMENT SYSTEM TRANSDUCER FAILURE DETECTOR

[75] Inventors: Richard F. Lach, Hartford, Conn.; Richard W. Calcasola, Longmeadow, Mass.

[73] Assignee: United Technologies Corporation, Hartford, Conn.

[21] Appl. No.: 219,740

[22] Filed: Dec. 23, 1980

[51] Int. Cl.$^3$ .............................................. H04J 3/14
[52] U.S. Cl. ...................................... 370/13; 370/15; 179/1 B; 179/175.1 A
[58] Field of Search ............................ 370/13, 15, 17; 179/1 B, 1 GB, 175.2 R, 175.1 A; 340/660, 664; 330/2

[56] References Cited

U.S. PATENT DOCUMENTS

| | | | |
|---|---|---|---|
| 3,566,038 | 2/1971 | Slavin | 370/110.1 |
| 3,585,307 | 6/1971 | Greenberg | 370/110.1 |
| 3,795,771 | 3/1974 | Gunderson et al. | 370/15 |
| 3,916,381 | 10/1975 | Johnson et al. | 340/660 |
| 4,065,647 | 12/1977 | Frye et al. | 179/175.1 A |
| 4,095,057 | 6/1978 | Power et al. | 179/175.1 A |

Primary Examiner—Gerald L. Brigance
Attorney, Agent, or Firm—Dominic J. Chiantera

[57] ABSTRACT

Common seat group transducer BITE circuitry located within the seat group SEB is responsive to the audio signal output of each transducer driver amplifier, the transducer BITE circuitry sensing the peak-to-peak voltage amplitude of the output signal to determine the operability of each driver, and sensing the current amplitude and frequency of the output signal to determine the transducer operability.

9 Claims, 5 Drawing Figures

PASSENGER ENTERTAINMENT SYSTEM TRANSDUCER FAILURE DETECTOR

DESCRIPTION

TECHNICAL FIELD

This invention relates to test equipment, and more particularly to built-in test equipment (BITE) for testing audio transducers in a passenger entertainment system (PES).

BACKGROUND ART

Modern passenger aircraft, such as the Boeing 767, include a passenger entertainment system (PES) for providing audio entertainment in the form of music, movie sound track, public address, etc. to the individual passenger seats of the aircraft. The seats are arranged in seat groups, each seat having its own acoustic type headset which is driven by a pair of audio transducers located within a passenger control unit (PCU) mounted in each seat. The transducers convert the electrical audio signals of the PES into acoustic waves which are communicated through the sound tubes of the headset to the ears of the passenger. Each PCU also includes channel selection and volume controls which allow the passenger to control the audio presented to the headset.

The PES systems are well known; the contemporary systems using a digitized audio signal distribution format, such as the pulse code modulation (PCM) format disclosed in U.S. Pat. Nos. 3,566,038 to Slavin and 3,795,771 to Gundersen, et al, with the PCM being decoded by a signal demultiplexer (DMUX) included within each seat electronics box (SEB) of each seat group. Typically, the PES is used in combination with a passenger service system (PSS) which provides the communication interface between the passenger and the available services, i.e. service calls to the attendant, or for turning on the individual seat lamps and air conditioning apparatus. The functions of the PES and PSS are autonomous, such that each is independent of the other in providing their respective passenger functions. The two systems do, however, share a common dependency with respect to the built-in test equipment (BITE) which performs an in situ test routine for determining the combined PES/PSS system integrity.

The PES/PSS BITE systems are also well known, as disclosed in U.S. Pat. No. 3,585,307 to Greensberg. The BITE tests a multitude of system functions, i.e. the operability of the various subsystems associated with the audio and service networks, one of which is the operability of the headset transducers. The BITE system of Greenberg provides for the transducer testing by mounting self-test circuitry within the PCU itself. The test circuitry includes band-pass filters inserted within the audio lines to the individual transducers from the seat group DMUX and separate transducer driver sense means, which in combination provide indications of: (1) the presence of an output from the DMUX audio driver, and (2) the electrical integrity of each transducer by sensing the presence of a prescribed transducer impedance value. This circuitry must be duplicated for each headset, such that each PCU includes dedicated transducer BITE components. The BITE transducer circuitry of Greenberg also requires individual filters and precision resistor networks for each transducer to permit accurate sensing of the selected transducer impedance value, all of which results in higher cost, higher weight, and lower BITE reliability.

DISCLOSURE OF INVENTION

The object of the present invention is to provide common seat group BITE circuitry for testing all of the drivers and transducers of each headset serviced by a seat electronics box (SEB) associated with the common seat group.

According to the present invention, common seat group transducer BITE circuitry located within the seat group SEB is responsive to the audio signal output of each transducer driver amplifier provided in response to a BITE audio signal presented to each driver by the SEB, the transducer BITE circuitry sensing the peak-to-peak voltage amplitude of the output signal to determine the operability of each driver, and sensing the current amplitude and frequency of the output signal to determine the transducer operability. In further accord with the present invention, each driver and related transducer is presented with the audio BITE signal individually one at a time in succession with each other driver being set to a DC output, the transducer BITE circuitry responding simultaneously to the positive and negative polarity of each driver test signal output to determine the operability of each driver within its linear range of operation, and responding to the presence of a bidirectional current of the output signal at a frequency equal to that of the audio test signal to determine the operability of the transducer.

In still further accord with the present invention, the transducer BITE circuitry includes a current sense transformer having a secondary winding and having a plurality of primary windings, each primary winding being connected in series between the output of an associated one of the driver amplifiers and the related transducer, whereby the presence of an output signal current component from each driver is coupled through the associated primary winding of the current transformer to the secondary winding to indicate the presence of a current signal path through the associated transducer. In still further accord with the present invention, the primary windings associated with the amplifier drivers of a common headset pair of transducers are connected to the related amplifier driver outputs in a phase opposing manner, such that the signal induced into the secondary winding from one of the amplifier drivers associated with a common headset is 180° out of phase with that induced into the secondary winding by the other one of the amplifier drivers, thereby maximizing signal noise rejection between transducer channels.

In still further accord with the present invention the transducer BITE module is used in combination with an electronic signal processor which is responsive to the voltage and current signal manifestations provided by the transducer BITE circuitry, the signal processor providing in response to the presence simultaneously of the signal manifestations of peak-to-peak voltage amplitude and current signal frequency, as indication of the operability of both the driver and associated transducer.

The transducer BITE circuitry of the present invention allows for detection of transducer operation without regard to the particular drive circuit configuration, i.e. the actual AC signal coupling (the coupling capacitor location) or the instant value of the volume set potentiometer. The module provides common test circuitry for all of the transducers associated with a common seat group, thereby eliminating the need for individual test circuitry within each PCU, so as to reduce weight and to enhance the test reliability.

These and other objects, features, and advantages of the present invention will become more apparent in light of the following description of the best mode embodiment thereof, as illustrated in the accompanying Drawing(s).

BRIEF DESCRIPTION OF DRAWING(s)

BEST MODE FOR CARRYING OUT THE INVENTION

Figure 1:
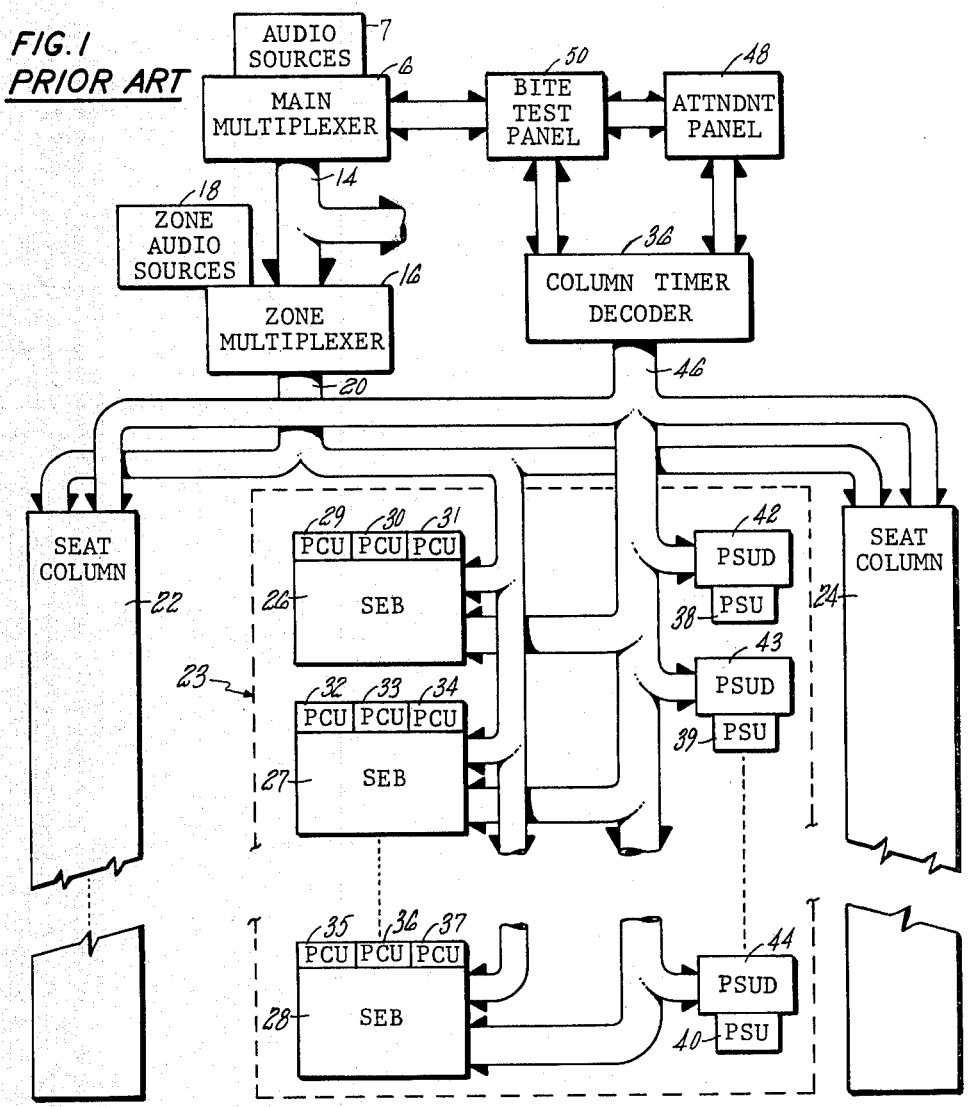
FIG. 1 is a system block diagram of a typical, prior art PES/PSS installation.
Figure 2:
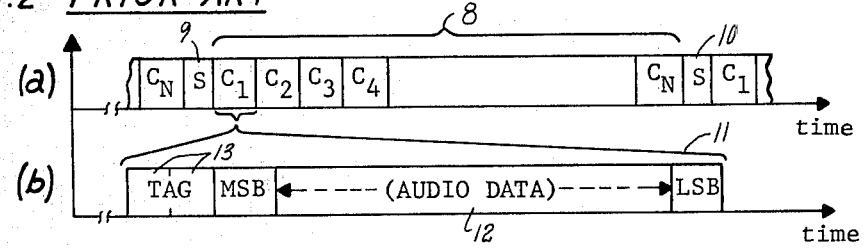
FIG. 2 is an illustration of a waveform associated with the system of FIG. 1.

FIG. 1 is a simplified illustration of a typical, prior art PES/PSS combination. The PES portion includes a main multiplexer (MUX) 6 responsive to audio signal inputs from some number of main audio sources 7 of the aircraft. The main MUX converts the audio signals from analog to digital format and multiplexes the signals from each of the different sources into a serial bit stream using a known format such as pulse code modulation (PCM). A typical PCM format is shown in FIG. 2, illustrations (a) (b) where the audio signals from each source are sampled and formatted by channel number into successive channel data words $C_1, C_2 \ldots C_N$ in successive data frames 8. The data frames are interspersed with synchronization pulses 9, 10 which synchronize the time base of the various demultiplexers associated with each seat group, as described hereinafter. Each data word 11 includes multiple bit (MSB . . . LSB) audio data 12 and at least two "tag" bits 13 which identify the audio data as monaural, stereo left/right, or BITE. The audio data for the BITE mode comprises a selected frequency audio signal which is common to all channels.

The multiplexed signal is provided on output lines 14 to one or more separate zones or passenger compartments of the aircraft, each zone including a zone MUX 16 responsive both to the multiplexed audio on the lines 14 and to the audio signals from one or more zone audio sources 18. The zone MUX multiplexes the various audio signals into a zone multiplexed signal of the same PCM format, which is provided on output lines 20 to the zone seat columns 22-24. Each seat column includes rows of seats, each row comprising a seat group of typically two to four seats. Each seat group is serviced by an associated seat electronics box (SEB) such as SEBs 26-38 of seat column 23, each of which includes PES and PSS circuitry related to servicing the passengers within the seat group. Each seat has its own passenger control unit (PCU) so that each SEB interfaces with between two and four PCUs, as illustrated by PCUs 29-37 for the SEBs 26-28. As stated hereinbefore, each PCU includes the seat heatset transducers which convert the electrical analog audio signal into an acoustic signal which is transmitted to the headsets, in addition to channel select and volume setting controls which permit passenger selection and control of the audio signals transmitted to the headset.

The PSS portion of the installation includes a column timer decoder (CTD) 36 which functions as a supervisory type control for service calls from each of the passenger seats. The service calls include request for an attendent and turn on of the passenger seat reading lamp; the leading and service lamps are in a passenger service unit (PSU) associated with the group, such as PSUs 38-40. Each PSU is serviced through a related passenger service unit decoder (PSUD) 42-44 and lines 46 to the CTD 36 and to each associated seat group SEB (26-28). The service calls are displayed by the CTD on a central attendant's panel 48.

The combined PES/PSS BITE system includes circuitry in each of the subsystems which are activated in the BITE mode. A BITE mode discrete is entered by the human operator either through the attendant's panel 48, or through a separate BITE test panel 50. In either case provision is made for accessibility by the maintenance personnel to initiate the BITE mode. Once selected the BITE mode status is evidenced by the discrete state of the tag bits of each channel data word. In response to the presence of the BITE test mode the system performs sequential tests of the various subsystem functions. For the present invention the only test routine of interest is the BITE mode transducer testing, and in response to the tag bits indicating a BITE mode the main and zone MUXs provide a test audio signal, typically 1.0 KHZ to each seat group SEB.

Figure 3:
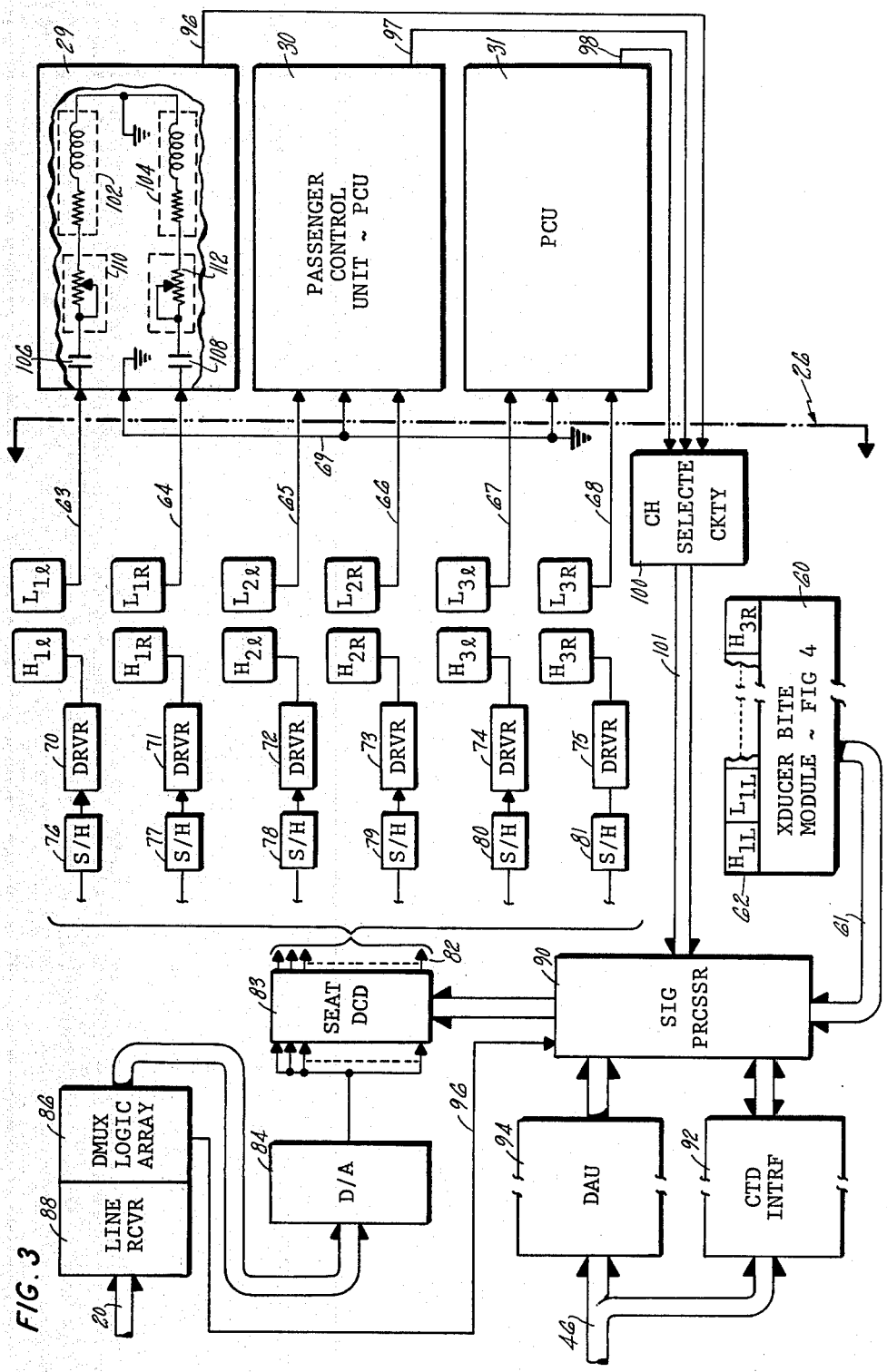
FIG. 3 is a system block diagram illustration of a seat electronics box (SEB) as used in a best mode embodiment of the present invention in the system of FIG. 1.

Referring now to FIG. 3, in a best mode embodiment of the present invention a transducer BITE module 60 is included as part of the circuitry of each SEB (26-28). The module includes output lines 61 and an input connector 62 which is connected to the output drive signal lines 63-68 from each of the transducer amplifier drivers 70-75 of the SEB. The embodiment of FIG. 1 assumes three seats per group and, therefore, three PCU (29-31) headsets. The SEB driver amplifiers are arranged in pairs, each associated with a corresponding pair of transducers in a related PCU. In FIG. 3 the connections of the module to the output line of each driver are labeled with the alphanumeric code shown, which is intended only to facilitate the present description. The letters H, L represent acronyms for "high" and "low" which in turn represent a high potential, or low potential connection, i.e. upstream or downstream from the amplifier output to the PCU. The numerical subscripts indicate the particular numbered seat, or headset, in the seat group, and the letter subscripts l, r designate the "left" or "right" transducer of the headset. To demonstrate, the designations H2l and L2l represent the high and low connections in the output of the driver 66 for the left transducer of the second headset in the seat group. Although not illustrated in FIG. 3 due to drawing limitation, each of the connections at the driver outputs are electrically connected to the connector 62 of the transducer BITE module.

The drivers each amplify the audio signals provided to associated sample/hold (S/H) 76-81 through the output lines 82 of a seat decoder 83 which receives the analog audio from a D/A converter 84. The D/A receives the individual channel audio in digital signal format from the DMUX logic array 86 of the SEB which in turn receives the multiplexed digital audio data through a line receiver 88 from the zone MUX output data line 20. The seat decoder is under control of a local signal processor 90 within the SEB, which may be a known type microprocessor such as the INTEL 8048. The processor also receives the output BITE test signals from the module, as described in detail hereinafter, on the lines 61. In the PSS portion of the SEB the processor 90 communicates with the column timer decoder (36, FIG. 1) through a CTD interface network 92, and acquires service data as to attendant calls, reading light, etc. from each seat through data acquisition circuitry (DAU) 94. The DAU and CTD interface are connected to the bus 46 from the CTD. In addition, the SEB receives audio channel selection information from each PCU (29-31) through lines 96-98 which are presented through channel select circuitry 100 and lines 101 to the signal processor.

The cutaway portion of the PCU 29 illustrates, schematically, the transducers 102, 104 as a series LR circuit. Each transducer receives the audio signal from the related drivers 70, 71 on lines 63, 64 through associated AC coupling capacitors 106, 108, which in the embodiment shown are located within the PCU. The coupling capacitors may in alternate embodiments, be located within the SEB drive circuit, but for the transducer BITE circuitry of the present invention their location is immaterial. Finally, each transducer is connected in series with its related volume set control 110, 112 to the SEB signal ground provided on line 69.

In normal operation, the SEB steers the particular audio channel selected by the PCU, as evidenced by the channel select circuit 100, to the PCU headset transducers by addressing the seat decoder 83 to the related S/H circuit in the presence of selected channel audio data from the D/A 84. In effect the seat decoder comprises a plurality of gated switches located in each of the lines 82, each of which are separately actuated to couple the audio from the D/A to the particular S/H. Normally each S/H is updated in each succeeding PCM frame (FIG. 2). In the presence of the BITE mode, as evidenced by a decode of the data word tag bits by the DMUX 86 and communicated to the processor through line 96, the processor updates only the S/H associated with the driver/transducer combination under test, setting the output of each other driver to some VDC output magnitude. This allows testing of each driver and transducer individually, one at a time by the transducer module, as described hereinafter with respect to FIG. 4, 5.

Figure 4:
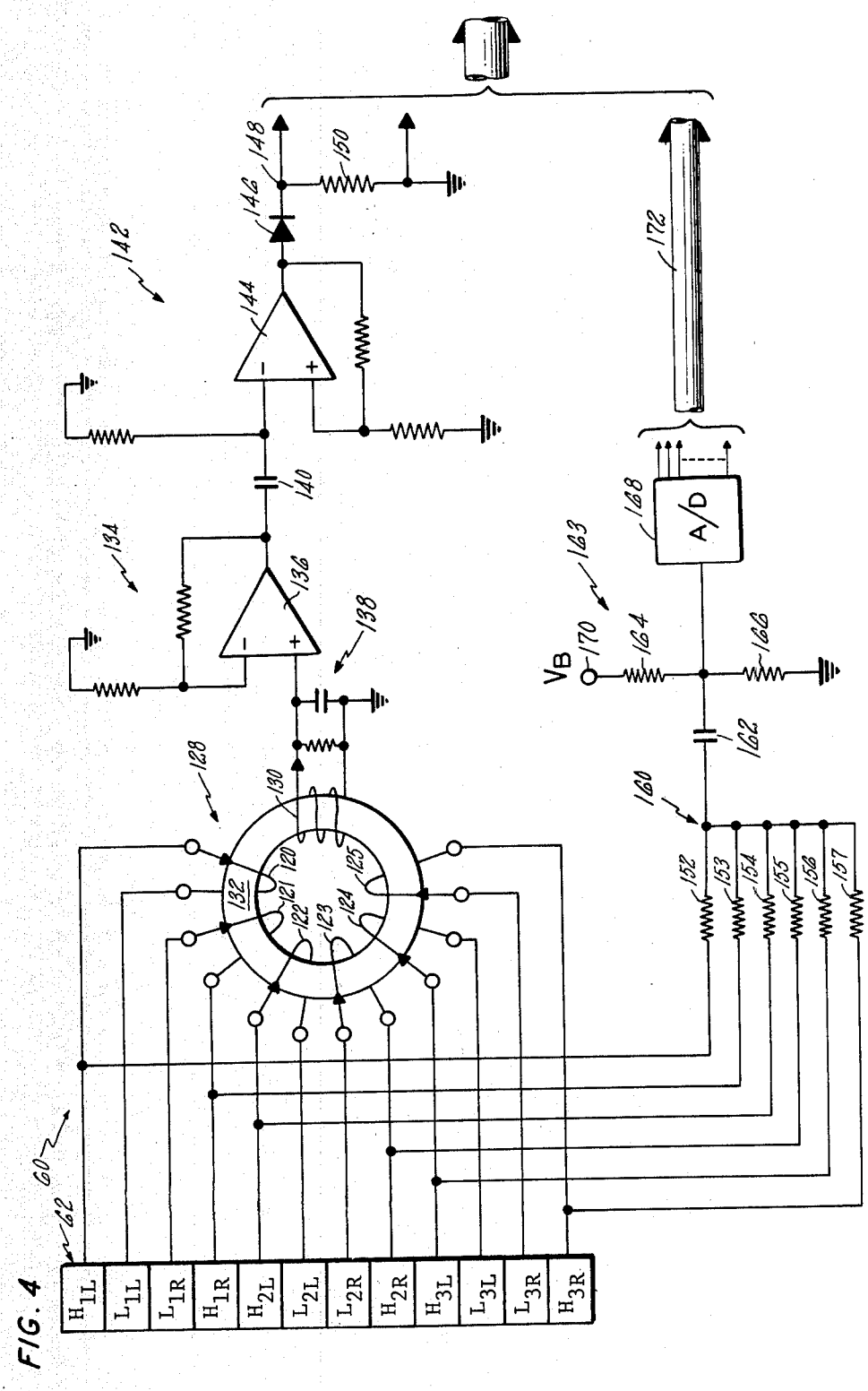
FIG. 4 is a schematic illustration of common seat group transducer BITE circuitry according to the present invention.

Referring now to FIG. 4, the transducer BITE module 60 receives the amplifier driver output lines 63-68 at the connector 62, with the connections illustrated by the code described hereinbefore. Within the module each output line is connected in electrical series with a related one of a plurality of primary windings 120-125 of a current transformer 128, which includes a secondary winding 130. Each primary winding is typically a single turn on the core 132 of the transformer, and each is illustrated with an accompanying arrowhead designating the phasing of the primary and secondary windings. In the best mode embodiment illustrated the high (H) and low (L) connections of adjacent driver output lines are connected in a phase opposing manner to the primary windings, such that the current signals induced in the secondary winding from the transducer drivers connected to adjacent primary winding are 180° out of phase. This minimizes the effects of any cross coupling of the power supply ripple frequency present at the outputs of the saturated driver amplifiers to the current BITE signal at the secondary winding 130 from the transducer/driver under test.

The preferred embodiment of the transformer 128 includes a torroidal shaped core, to minimize the leakage inductance and to ensure high coupling efficiency for the current signals. The secondary winding 130 includes multiple turns; the transformer functions as a step-up transformer with a defined turns ratio ($N_S/N_P$) selected to minimize cross-coupling between the amplifier driver outputs during normal PES audio operation, since the amplifier driver outputs are all connected to the common transformer core.

In the transducer BITE routine the MUXs, both main and zone, transmit an audio test signal on all channels. The test signal, typically 1.0 OKHZ, is strobed through the seat decoder by the processor to each S/H individually in sequence. A normally operating driver and transducer produce an output signal current which flows through the related primary winding and is transformer coupled to the transformer secondary winding 130. The presence of a secondary winding signal at the BITE test signal frequency indicates both an operating transducer and driver. Either an open transducer or saturated driver results in a zero secondary winding output. This is referred to as the transducer current BITE test signal which must first be signal conditioned prior to presentation to the processor on output lines 61.

The current BITE signal conditioning is provided in a first gain stage 134 which, as shown, may include a non-inverting operational amplifier 136 with an input low pass filter 138 to reject high frequency noise and to provide a low value reflected impedance to each primary winding. The amplified signal from the gain stage 134 is AC coupled through a capacitor 140 to a comparator stage 142. The capacitor rejects any DC offset present in the first gain stage, and the comparator squares up the AC signal for presentation to the processor. Preferably the amplifier is powered from the logic power supply of the SEB to provide, directly, an output processor compatible signal. The comparator may include an operational amplifier 144 provided with hysteresis to prevent noise triggering of the comparator. The output from the comparator is diode coupled through steering diode 146 to output line 148 included within the lines 61 from the module. The diode provides a unipolar output signal which is processor compatible. An output termination resistor 150 is also provided.

The amplifier gain stage 134 and the comparator stage 142 are representative of the type signal conditioning required. It should be understood, however, that any other suitable type of signal conditioning and/or shaping circuitry which may be known to those skilled in the art may be used to provide a processor compatible signal indication of the secondary winding current BITE signal.

In addition to the current BITE test, the module performs a voltage BITE test for each driver by monitoring the peak-to-peak output voltage swing of each driver amplifier during the transducer BITE test mode. Since the current BITE failure may be due either to a failed transducer or driver, the voltage BITE test isolates on the driver operability alone. This is provided by coupling each of the driver high (H) connections at the connector 62 through one of a plurality of resistors 152-157 to a common summing junction 160. A capacitor 162 provides AC coupling from the summing junction to a scaling network 163 provided by series connected resistors 164, 166 at the input of an analog-todigital (A/D) converter 168. The resistors 164, 166 are connected together at one end to the input of the A/D; the other end of resistor 164 is connected to a bias voltage source 170 and the other end of resistor 166 is connected to signal ground. The capacitor 162 couples the peak-to-peak signal amplitude to the scaling network, while rejecting any DC offset voltages present. The scaling network with the bias source 170 converts the peak-to-peak swing to a uni-polar, A/D compatible input signal. The A/D converts the analog signal amplitude into a multiple bit digital signal equivalent which is provided on output lines 172 included within the lines 61 from the module to the signal processor.

In the operation of the voltage BITE test, the driver under test receives the BITE audio signal from the associated S/H and provides an equivalent frequency audio signal on its output line; the remaining amplifier drivers are driven to a VDC output by the signal processor which does not strobe in the audio test signal to the related S/H circuits. The summing junction 160 receives the BITE audio signal together with the VDC saturated output signals from each of the remaining drivers. Capacitor 162 couples the audio signal component to the scaling network 163 which converts it to a scaled peak-to-peak amplitude, uni-polar signal prior to presentation to the A/D. The A/D then provides the digital signal equivalent on output lines 172 to the signal processor.

The uni-polar audio signal on line 148 represents the current BITE test result, and the digital signal on lines 172, indicative of the peak-to-peak voltage amplitude of the driver output, represents the voltage BITE test result. Each signal is read by the SEB signal processor 90 in sequence for each headset transducer in a sub-routine performed during the BITE mode.

Figure 5:
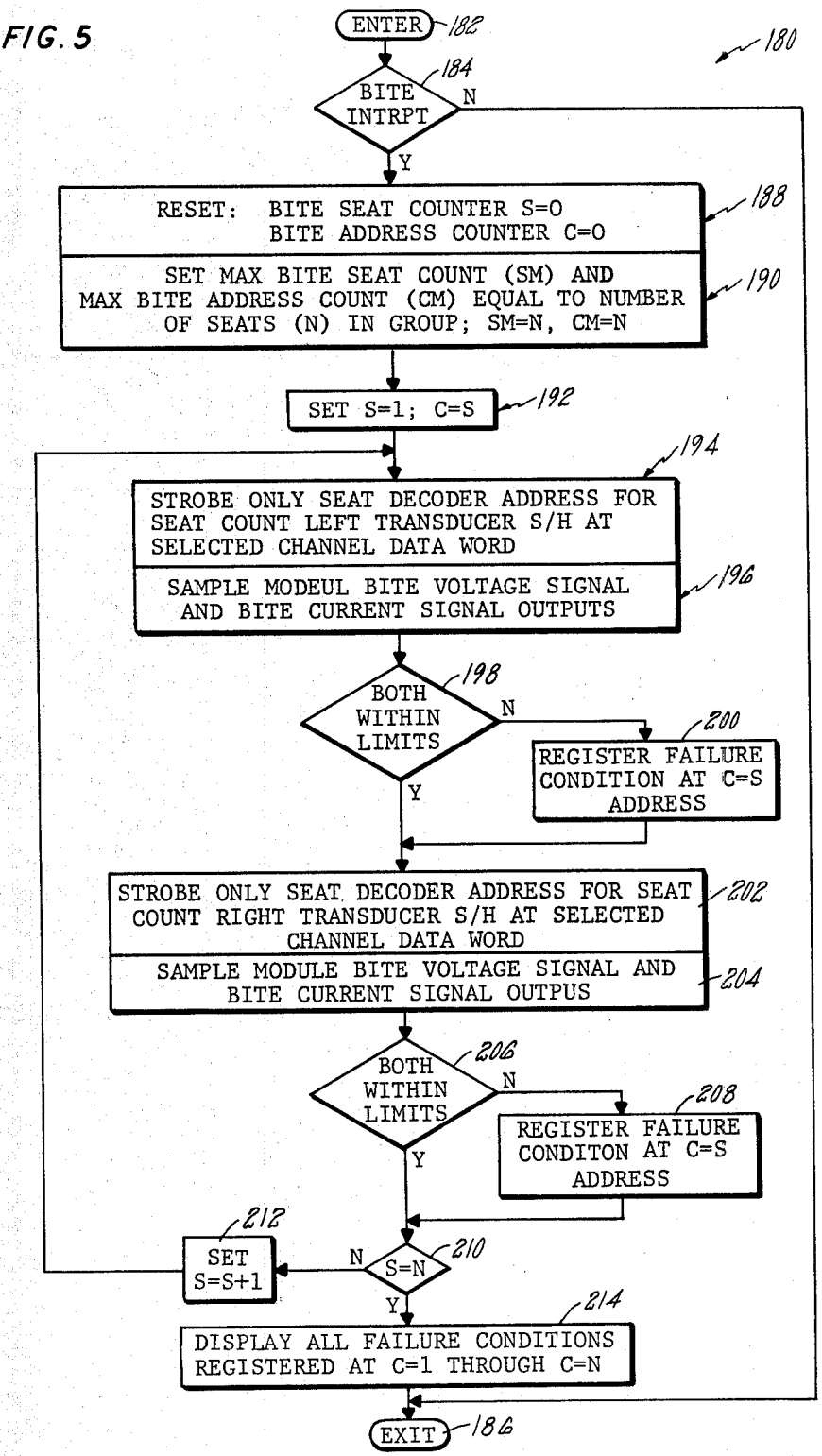
FIG. 5 is a simplified logic flowchart diagram illustrating the functions performed by the common transducer BITE circuitry of the present invention.

Referring now to FIG. 5, in a simplified flowchart diagram of the sub-routine 180 executed by the processor in performing the transducer BITE tests, the processor enters the flowchart at 182. Decision 184 determines if a BITE interrupt is present. This interrupt is the decode of the tag bits provided by the DMUX logic array 86 (FIG. 3) to the processor. If NO interrupt, the processor exits the sub-routine at 186. In the presence of an interrupt, i.e. a YES, the processor executes instructions 188 to reset a BITE seat counter (S=0) and an address counter (C=0), after which instructions 190 request the setting of the maximum seat count number ($S_M$) and the max address count ($C_M$) equal to the number of passenger seats (N) in the seat group.

The processor next performs the actual testing of each driver/transducer beginning with instructions 192 which set the seat counter to the first seat number (S=1) and the address counter C to the present value of S (C=S). The particular audio channel strobed by the seat decode into the various seat headset transducers is determined by the actual position of the channel select in each individual PCU; however, all of the audio channels from the zone MUX include the audio test signal such that the same audio signal is presented to each of the transducer drivers regardless of the last selected channel. Instructions 194 request the processor to strobe the seat decoder (85, FIG. 3) at the address corresponding to the left transducer S/H in the presence of the last selected channel for that particular seat as indicated by the output of the channel select circuitry. With the strobe of the left transducer S/H, the processor samples the module current and voltage BITE signals on the lines 61 in instructions 196, and decision 198 determines if both BITE signals are within the prescribed tolerance limits. If either is outside of the test limits, resulting in a NO, then the processor executes instructions 200 which registers the failure condition at the address associated with the count C=S. The failure conditions for the current BITE and voltage BITE may be registered separately to allow the maintenance personnel to isolate the failure to the drivers (SEB) or the transducers (PCU); each being line replaceable units. Following instructions 200 or a YES to decision 198, the processor then tests the right transducer driver beginning with instruction 202 which strobes only the seat decoder address for the S/H of the right transducer, at the last selected channel. Instructions 204 require sampling of the module current and voltage BITE signals, and decision 206 determines if these signal magnitudes are within the prescribed limits. If either are out of limits, the processor executes instruction 208 to register the failure condition at the address associated with the instant address count, in the same manner as instructions 200. Following instructions 208, or a YES to decision 206, the processor executes decision 210 to determine if this is the last seat in the seat group. If NO, instructions 212 increment the seat counter by one and the processor again cycles through instructions 194–210 for the next seat. If the answer to decision 210 is YES, then instructions 214 request the display of all the registered failure conditions for the seat group; i.e., those recorded at the address locations from C=1 to C=N, after which the processor exits at 186.

The display of the recorded failure conditions may be provided in a number of ways. If a separate BITE test panel (50, FIG. 1) is present, it may be used to display the recorded failure conditions in each seat group. Alternatively, as in prior art BITE systems, the attendant's panel (48, FIG. 1) may be used, in which case the call lights associated with the seats are used to provide the indication. In either case a visual indication is provided to the operator of the test results so that appropriate repair or replacement may be made.

The flow chart diagram of FIG. 5 is only illustrative of one way in which the processor, or equivalent hardware configuration of the processor, may perform the current and voltage BITE test functions. Any one of a number of alternative sequences, which perform the same functional test determinations, and which are known to those skilled in the art may be used.

The transducer BITE module of the present invention may be used in combination with the SEB signal processor, or with discrete circuitry which performs the BITE functions performed by the signal processor, to provide an accurate test of the integrity of both the transducer driver and the transducers themselves. The use of a current transformer to detect a current component in the output driver test signal provides an accurate test of the transducer operability and may be used in any type of transducer drive circuit arrangement. The present transducer BITE test apparatus is not application limited, as is true of the prior art devices. The present test circuitry may be used in any type of PES without regard to the physical location of the capacitors used to couple the electrical audio signal from the driver to the transducers; i.e., coupling capacitors 106, 108 in FIG. 3, and without the requirement for precision resistor networks to sense the transducer impedance in the presence of a variable volume set impedance.

The current transformer primary windings are electrically connected in series with each of the driver outputs, each having as little as a single turn on the transformer core, such that the impedance associated with each is negligible when compared to the nominal load of the driver. The same transformer is used for all of the transducer drivers in a common seat group, thereby greatly reducing the component size and weight associated with the prior art device BITE test circuits. The use of the phase reversed connections to the primary windings results in rejection of any power supply ripple frequency present on the outputs and eliminates extraneous, spurious noise which may interfere with the result of the current BITE test. Selection of the transformer turns ratio also allows for a minimum cross-coupling effect between channels, such that in normal operation the connection of all the drivers to a common core does not produce cross talk which would detract from audio fidelity.

The present invention may be used with either the signal processor present in the SEB or may include its own dedicated signal processor which also may take the form of a proprietary type microprocessor, or an embodiment of a discrete hardware component, as may be obvious to those skilled in the art. Similarly, the signal conditioning circuitry used in the transducer module itself may take different forms all of which are obvious to those skilled in the art.

Although the invention has been shown and described with respect to a best mode embodiment thereof, it should be undertood by those skilled in the art that the foregoing and various other changes, omissions, and additions in the form and detail thereof, may be made therein without departing from the spirit and scope of this invention.

We claim:

1. Transducer BITE sensor for providing signal manifestations, to the BITE circuitry of a passenger entertainment system (PES), of the response of the audio transducers and associated driver amplifiers of one or more PES headsets to an audio test signal presented to each headset amplifier driver individually during a PES transducer BITE test routine, comprising:

voltage sensing means, connected to the signal output of each driver amplifier for sensing the peak-to-peak amplitude of the output voltage signal response of each amplifier to the presentation of the audio test signal, as an indication of the driver amplifier operation, and for providing for each amplifier under test a voltage BITE signal manifestation indicative thereof to the PES BITE circuitry; and current sensing means, connected to the signal output of each driver amplifier, for sensing the presence of a current signal component in the output signal response of each driver amplifier to the presentation of the audio test signal, as an indication of the related audio transducer operation, and for providing for each transducer under test a current BITE signal manifestation indicative thereof to the PES BITE circuitry.

2. The transducer BITE sensor of claim 1, wherein said current sensing means comprises:

transformer means, having a transformer core including a plurality of primary windings disposed thereon, each primary winding being electrically connected in series with the output of an associated one of the driver amplifiers to detect the presence of a current signal provided by each amplifier to its related transducer in response to the presentation of the audio test signal, said transformer further including a secondary winding disposed on said core and responsive to current signals in each of said primary windings for providing a secondary current signal indication of each at an output thereof; and signal conditioning means, connected for response to said secondary winding output, for providing said current BITE signal manifestation in the presence of each of said secondary current signal indications.

3. The transducer BITE sensor of claim 2, wherein said transformer core is in the form of a torroid, whereby said transformer means has minimum leakage inductance and high coupling efficiency between said secondary winding and each of said primary windings.

4. The transducer BITE sensor of claim 2, wherein each of said primary windings is disposed on said core with a single turn to provide a minimum series impedance value to the output of each associated amplifier and a corresponding minimum primary winding voltage signal in response to the current signals through each, and wherein said secondary winding is disposed on said core with multiple turns, whereby said transformer means is a step-up transformer for providing a secondary winding voltage signal in response to each of said secondary current indications which is at a higher amplitude than the primary winding voltage signal of the responded to primary winding current signal.

5. The transducer BITE sensor of claim 4, wherein said signal conditioning means provides said secondary winding with a low value impedance termination, whereby each primary winding in turn is provided with a minimum value reflected impedance.

6. The transducer BITE sensor of claim 2, wherein said signal conditioning means provides each of said current BITE signal manifestations as a unipolar signal equivalent of the responded to one of said secondary current signal indications.

7. The transducer BITE sensor of claim 2, wherein said primary windings associated with the driver amplifiers of a common headset are electrically connected to the common headset amplifiers in a relative, signal phase opposing manner, whereby the current signals provided through each of the primary windings from the associated amplifiers of the common headset are substantially one hundred eighty degrees out of phase with respect to each other.

8. The transducer BITE sensor of claim 2, wherein said voltage sensing means comprises:

voltage summing means, responsive to the voltage output signals from each of said driver amplifiers for providing a sense voltage signal representative of the sum signal value of the simultaneous output voltage signals from the instant driver amplifier under test and from each of the other driver amplifiers of all of the headsets responded to by said transducer BITE sensor; and second signal conditioning means, responsive to said sense signal for detecting therefrom the presence of a peak-to-peak amplitude value signal, and for providing said peak-to-peak value signal as said voltage BITE signal manifestation.

9. The transducer BITE sensor of claim 8, wherein said second signal conditioning means provides said voltage BITE signal as a unipolar representation of said detected peak-to-peak value signal.

* * * * *